United States Patent
Wiemeri et al.

[19]

[11] Patent Number: 6,085,811
[45] Date of Patent: Jul. 11, 2000

[54] BOOM ASSEMBLY AND PLATFORM FOR TRACKED FELLER BUNCHER MACHINE

[75] Inventors: Ronald W. Wiemeri; Neil R. Engel, both of Owatonna, Minn.

[73] Assignee: Blount, Inc., Montgomery, Ala.

[21] Appl. No.: 09/267,868

[22] Filed: Mar. 12, 1999

[51] Int. Cl.[7] .................................................. H01G 23/08
[52] U.S. Cl. ...................... 144/4.1; 144/24.13; 144/336; 180/41; 180/89.14; 180/9.1; 414/486
[58] Field of Search .................................. 144/4.1, 23.13, 144/34.1, 34.5, 335, 336, 339, 486; 180/9.1, 41, 89.14

[56] References Cited

U.S. PATENT DOCUMENTS

| | | |
|---|---|---|
| 4,046,179 | 9/1977 | Crawford . |
| 4,326,571 | 4/1982 | Crawford . |
| 4,540,032 | 9/1985 | Pelletier et al. ........................ 144/4.1 |
| 4,565,486 | 1/1986 | Crawford et al. . |
| 4,583,908 | 4/1986 | Crawford . |
| 4,763,742 | 8/1988 | Langford ................................... 144/4.1 |
| 4,823,852 | 4/1989 | Langford ................................... 144/4.1 |

OTHER PUBLICATIONS

Excerpt of drawing of "Selma/Grove MZ46 & MZ40 1977".
Excerpt of drawing of "MZ40 1977 Selma/Grove".
Excerpt of drawing of "Grove Industrial Z4 1975" (Lift Cylinder Installation–Drawing No. L–2–144–2–00025).

*Primary Examiner*—W. Donald Bray
*Attorney, Agent, or Firm*—Richard G. Lione; Brinks Hofer Gilson & Lione

[57] ABSTRACT

A timber harvesting machine including a chassis supported by endless tracks. A platform is mounted on the chassis. A platform is rotatable on the turntable in an annular bearing race on the turntable. A boom is mounted on the platform and includes a main boom mounting pin which is pivoted on one side of the axis of rotation of the platform. A boom actuating cylinder has a mounting pin which is mounted on the other side of the axis of rotation and directly over the annular bearing race regardless of the rotational position of said platform relative to said turntable.

11 Claims, 4 Drawing Sheets

BOOM ASSEMBLY AND PLATFORM FOR TRACKED FELLER BUNCHER MACHINE

FIELD OF THE INVENTION

This invention relates generally to timber harvesting machines. It relates particularly to a type of timber harvesting machine commonly referred to as a feller buncher.

BACKGROUND OF THE INVENTION

Feller buncher machines in use today in the timber harvesting business are commonly either one of two types. A first type comprises a four-wheel drive tractor with a bunching shear or bunching saw attachment mounted on its front end. An example of this first type of feller buncher machine is the HYDRO-AX Model 511 EX machine manufactured and sold by the Foresting and Industrial Equipment Division of Blount, Inc. in Owatonna, Minn. A second type comprises a tracked vehicle mounting a rotatable boom which carries a bunching shear, bunching saw or delimbing device or the like at its free end. An example of this second type of feller buncher machine is illustrated in the Crawford U.S. Pat. No. 4,583,908.

In the second type of machine, a boom platform is rotatably mounted on a turntable supported by a chassis. The chassis is supported by a pair of endless tracks. The endless tracks are independently driven by hydrostatic motors. The boom platform mounts a boom having a bunching shear or tree delimbing device or some other tool at its free end. The platform and, thus, the boom are rotatable through an arc of 360° about the axis of an annular ring bearing on the turntable which supports the platform.

In the machine illustrated in the Crawford patent, the boom is pivotally mounted on the rear of the platform, outside of a circle defined by the ring bearing. The actuator cylinder for the boom is pivotally mounted on the platform rearwardly of the platform's axis of rotation, but inside the circle defined by the ring bearing. As a result, the loads concentrated at the boom base pin and the actuator cylinder base pin are not balanced relative to the supporting ring bearing. Pin load reaction on the boom platform is not balanced. The bearing ring is subjected to widely varying stresses at different locations as the boom platform rotates. Unequal stress in the bearing and the platform requires heavier components and results in undue wear and shortened service life.

SUMMARY OF THE INVENTION

It is an object of the present invention to provide an improved tracked feller buncher machine.

It is another object to provide a new and improved turntable, rotatable platform and boom assembly for a tracked feller buncher machine.

It is still another object to provide a turntable, rotatable platform and boom assembly for a tracked feller buncher machine wherein stresses are reduced on the platform and the ring bearing which supports the platform as it rotates.

It is yet another object to provide a turntable, rotatable platform and boom assembly wherein the arrangement of the boom mounting pin and the boom actuator cylinder mounting pin reduces stress and wear.

The foregoing and other objects are realized in accord with the present invention by providing a tracked feller buncher machine having a platform and boom rotatably supported on a turntable. The boom is pivotally mounted between vertical mounting bracket plates on one side of the platform. The boom actuator cylinder is pivotally mounted between the plates at a location which is in vertical alignment with circle defined by an annular bearing race which supports the platform, and is opposite the rotational axis of the platform from the pivot connection between the boom and the platform. The boom is also pivotally connected to the platform at a location outside of the circle defined by the annular bearing race.

The platform is rotatably supported in the ball bearing race on the turntable. The mounting pin for the boom cylinder pivots on an axis which is 9.87 inches above a plane in which the ball bearings rotate and 22.00 inches in front of the axis of rotation of the platform. The mounting pin for the boom pivots on an axis which is 19.78 inches above the aforementioned plane and 55.18 inches behind the axis of platform rotation. The diameter of the circle defined by the bearing race is 44.00 inches.

The aforedescribed turntable, bearing race, platform and boom configuration affords the machine very good stability under all operation conditions. At the same time stress on various components is minimized.

BRIEF DESCRIPTION OF THE DRAWINGS

The invention, including its construction and method of operation, is illustrated more or less diagrammatically in the drawings, in which.

DESCRIPTION OF THE PREFERRED EMBODIMENT

Figure 1:
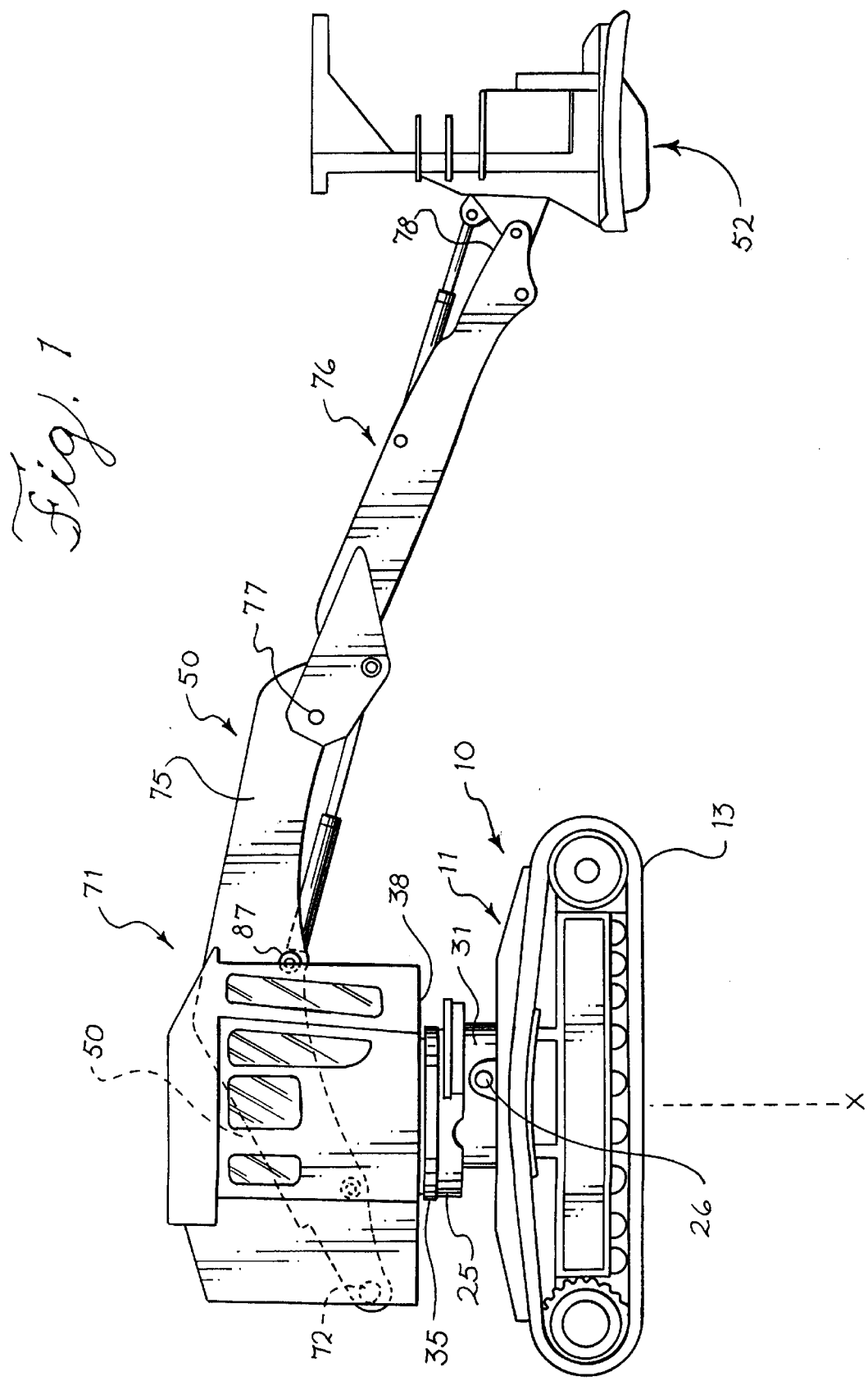
FIG. 1 is a side elevational view of a tracked feller buncher machine embodying features of the present invention.
Figure 2:
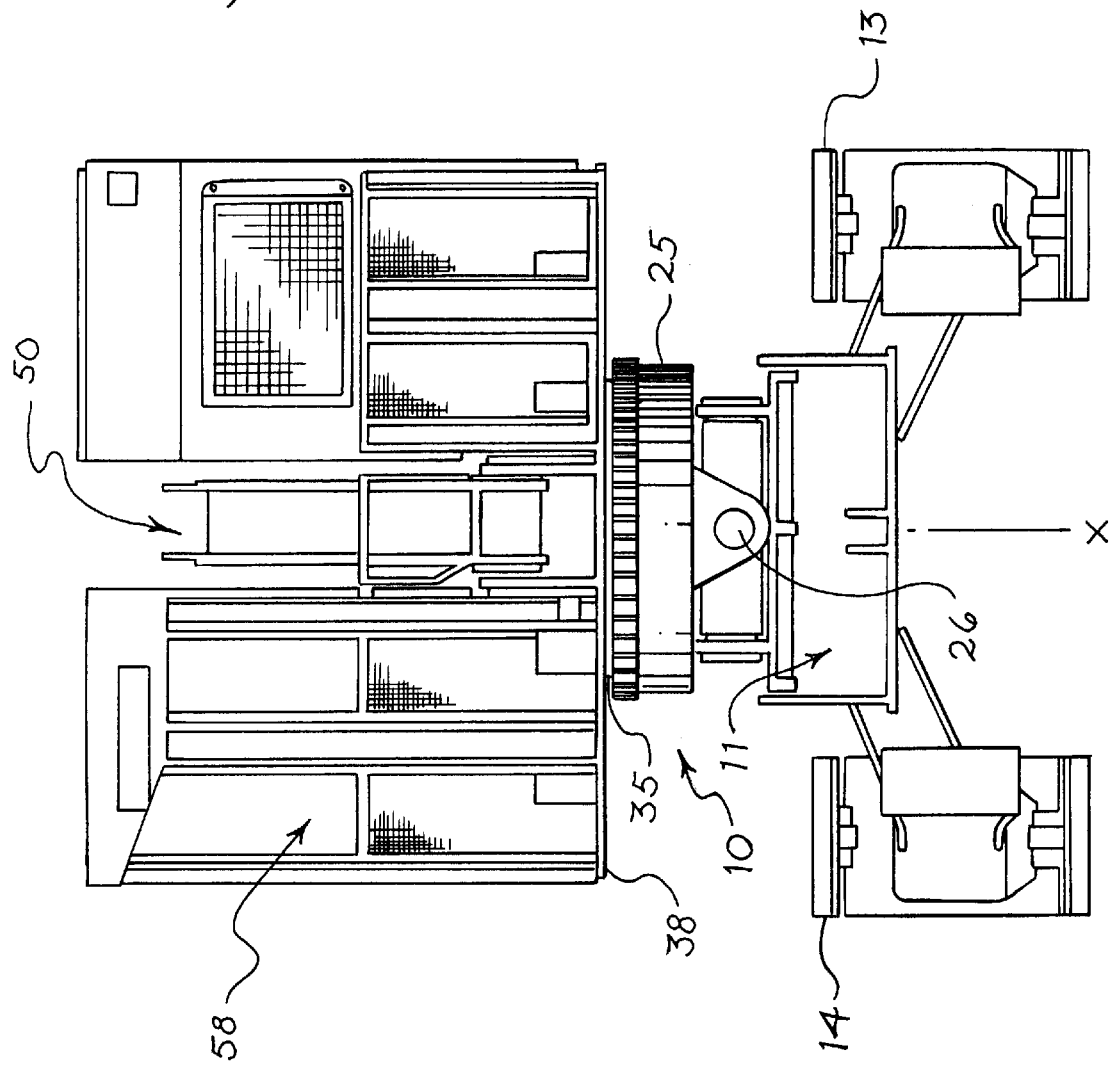
FIG. 2 is a rear elevational view of the tracked feller buncher machine illustrated in FIG. 1, with parts broken away.

Referring now to the drawings, and particularly to FIGS. 1 and 2; a tracked feller buncher machine embodying features of the present invention is illustrated generally at 10. The machine 10 includes a chassis 11 supported by two endless tracks 13 and 14. The endless tracks 13 and 14 are hydrostatically driven in a conventional manner.

Mounted on the chassis 11, above the endless tracks 13 and 14, is a turntable 25. The turntable 25 is mounted on the chassis 11 for universal tilting movement about pivot bearings 26 so that the turntable can be maintained level regardless of terrain variations. Tilting of the turntable 25 relative to the chassis is effected by the machine 10 operator through coordinated actuation of four hydraulic cylinders 31.

The turntable 25 has an annular swing bearing 35 mounted on its upper surface 36. Seated in the swing bearing 35 is a rotatable platform 38. The swing bearing 35 supports the platform 38 for rotation about the axis X of the bearing.

A boom 50 is mounted on the platform 38. In the machine 10 illustrated, the boom 50 carries a bunching saw attachment 52 at its free end 53. As best seen in FIG. 2, the boom 50 is mounted on the platform 38 so that the axis X of rotation of the platform extends vertically through the boom 50 on the center line of the boom.

An operators cab 56 is mounted on the platform 38 to the right of the boom 50, as seen in FIG. 2. The power plant 58 for the machine, i.e., an internal combustion engine and hydraulic pump complex (not shown), is mounted on the platform 38 to the left of the boom 50. The machine 10 operator controls the output of the power plant 58 from the cab 56.

Figure 3:
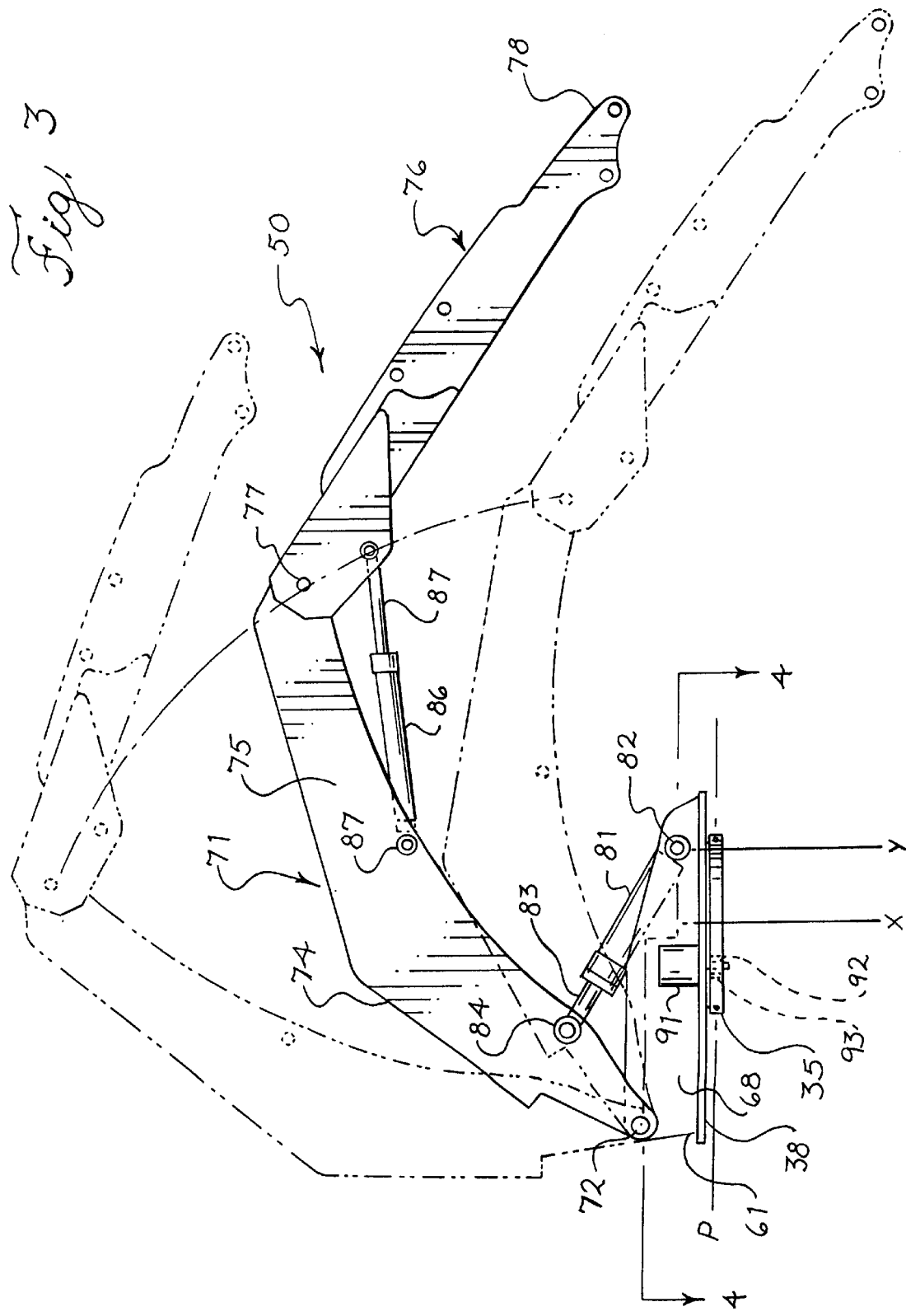
FIG. 3 is an enlarged side elevational view of portions of the turntable, rotatable platform and boom assembly in the tracked feller buncher machine illustrated in FIGS. 1 and 2, with the boom shown in phantom lines in two alternative operating positions.
Figure 4:
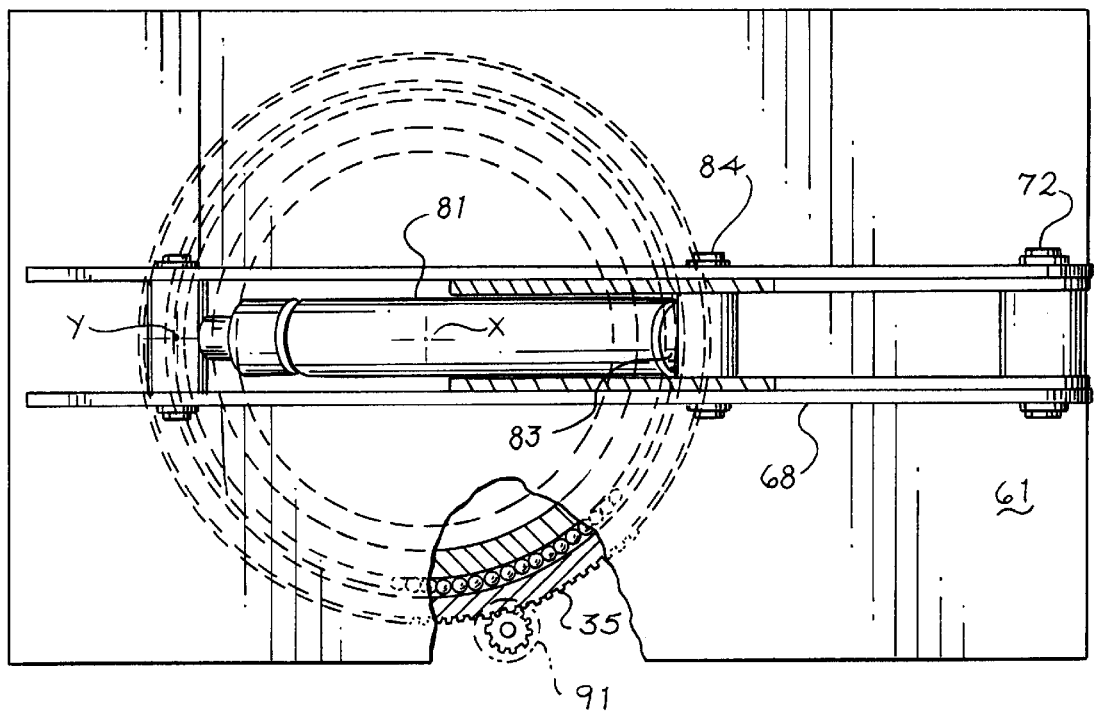
FIG. 4 is an enlarged sectional view taken along FIG. 4—4 of FIG. 3, with parts broken away.
Figure 5:
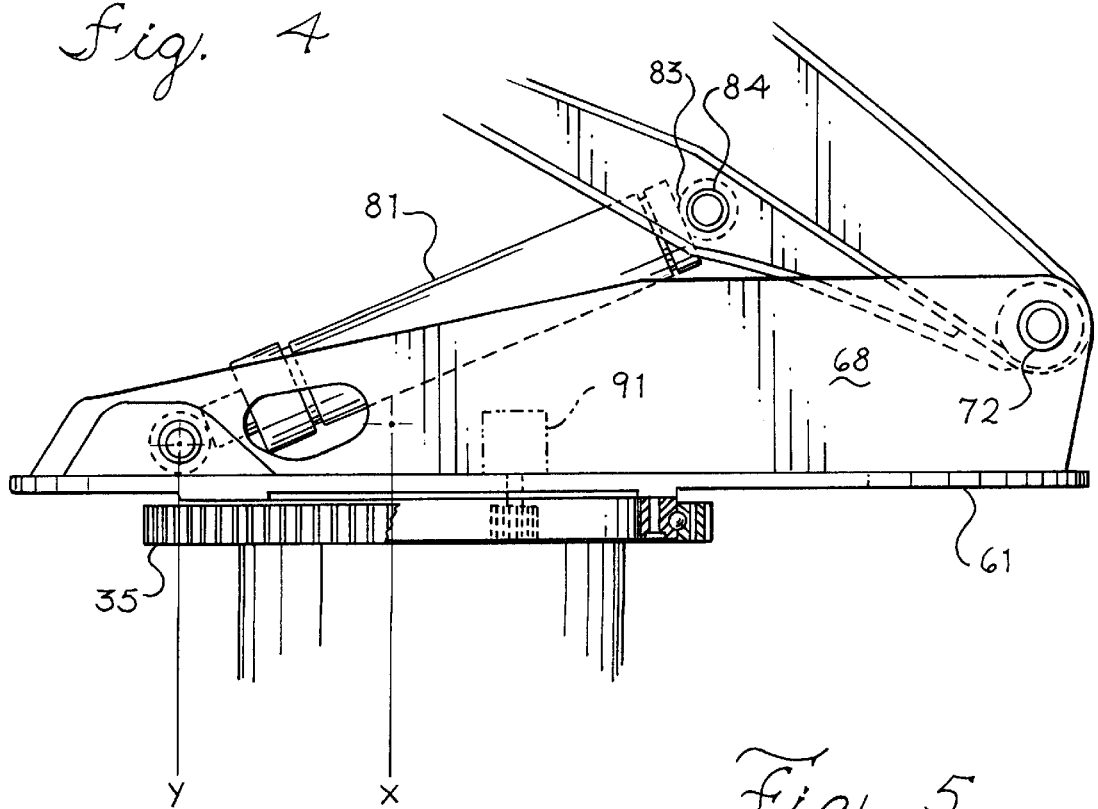
FIG. 5 is a partial side sectional view of the structure illustrated in FIG. 4.

Referring now to FIGS. 3 and 4, in addition to FIGS. 1 and 2, the boom 50 is mounted on the generally rectangular deck 61 of the rotatable platform 38. The deck 61 is fabricated of steel plate and has an annular steel track 62 welded to its lower surface. The annular track 62 is seated in the annular swing bearing 35, wherein it is rotatable about the axis X of the swing bearing.

The annular swing bearing 35 contains a ball bearing race 63 extending around its inner periphery. The annular track 62 rides on the bearing race 63, which then bears the constantly shifting load of the rotating boom 50. The circle C defined by the ball bearing race 63 is 44.00 inches in diameter so that its radius, relative to the axis X, is 22.00 inches.

The boom 50 is mounted on a pair of brackets 68 which are vertically oriented plates and extend across the deck 61 on opposite sides of the axis X. The boom 50 includes a main boom component 71 having a predetermined width slightly less than the width of the space between the brackets 68 and pivotally connected between the brackets on a base pin 72. The base pin 72 extends between the brackets 68 so that the main boom component is pivotable vertically relative to the rotatable platform 38 in a plane which contains the axis X.

The main boom component 71 includes an inner boom section 74 and an outer boom section 75. These sections are inclined at an angle of about 30° to each other so that the outer boom section 75 inclines rearwardly of the inner boom section 74.

Pivotally connected to the free end of the outer boom section 75 is a knuckle boom component 76. The knuckle boom component 76 is mounted on a base pin 77 which is seated in the free end of the outer boom section 75. The knuckle boom component 76 has the aforementioned bunching shear attachment 52 mounted on its free end 78 (see FIGS. 1 and 2).

The main boom component 71 is pivoted about its base pin 72 by a hydraulic cylinder 81. The hydraulic cylinder 81 is connected between the mounting brackets 68 on a base pin 82 and within the width of the main boom component 71. The base pin 82 is located so that a line Y extending through its pivot axis, parallel to the axis X, passes vertically through i.e., intersects the circle C defined by roller bearings in the roller bearing race 63. Thus, the pivot axis of the base pin 82 of the cylinder 81 is 22.00 inches forward (in the direction of the boom 50) of the axis X. Meanwhile, the pivot axis of the base pin 72 is 55.18 inches rearward of the axis X.

In the machine 10, the pivot axis of the base pin 72 is also 19.78 inches above the horizontal plane P which passes through the center of the ball bearing race 63. The pivot axis of the cylinder base pin 82 is, on the other hand, 9.87 inches above this plane P.

The hydraulic cylinder 81 has an actuator piston 83 which is pivotally connected to the inner boom section 74 of the main boom component 71 at 84. Thus, the cylinder 81 is arranged to pivot the entire boom 50 about the axis of the main boom base pin 72.

The knuckle boom component 76 is pivoted about the pivot axis of the base pin 77 by a hydraulic cylinder 86. The hydraulic cylinder 86 is connected to the main boom 71 on base pin 87. The cylinder 86 has an actuator piston 88 which is pivotally connected at 89 to the knuckle boom component 76. Thus, the cylinder 86 is arranged to pivot the knuckle boom component 76 relative the main boom component 71, about the pivot axis of the pin 77.

The operator rotates the platform 38 and boom 50 about the axis X by actuating a fluid motor 91 mounted on the deck 61. The motor 91 has pinion gear 92 on its output shaft, and that pinion gear meshes with a ring gear 93 mounted on the turntable 25, concentric with the axis X.

The operator can extend, retract, raise or lower the bunching shear attachment 52 on the boom 50 by actuating the cylinders 81 and 86 in a suitable manner. Two alternate operational positions of the boom 50 are shown in phantom lines in FIG. 3.

In the lowermost phantom line position of the boom 50 in FIG. 3, the stress on the rotatable platform 38 and the turntable bearing race 63 is the greatest, of course. Because the cylinder base pin 82 is located directly over the circle C defined by the ball bearing in the bearing race 63, however, regardless of the rotational position of the platform 38 and 50, and base pin 72 axis and base pin 82 axis are positioned in the manner heretofore described, the platform and the supporting bearing race 63 and turntable are subjected to the minimum possible stress. This is true whether the boom 50 is retracted into the upper configuration shown in phantom lines in FIG. 3 or is fully retracted so that the knuckle boom 76 is virtually parallel to the main boom 71.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. A machine for harvesting timber, comprising:
    a) a chassis supported by a pair of endless tracks;
    b) a turntable mounted on said chassis and an annular ball bearing race on said turntable, said annular ball bearing race defining a circle;
    c) a platform seated on said turntable and rotatable on said bearing race about an axis of rotation; and
    d) a boom on said turntable, said boom including a main boom component and a main boom component actuator cylinder;
    e) said main boom component actuator cylinder being pivotally connected to said platform for movement about a pivot axis which is in substantially vertical alignment with the annular bearing race, regardless of the rotational position of said platform relative to said turntable;
    f) said main boom component being pivotally connected to said platform outside of said circle.

2. The machine of claim 1 further characterized in that:
    a) said main boom actuator cylinder being pivotally connected to said platform on a pivot axis which is approximately 50% as far from said plane as the pivot axis of the connection between said main boom component and said platform.

3. In a vehicular machine for harvesting timber wherein the machine includes a chassis supported by drive members, the improvement in a turntable, rotatable platform and boom assembly, comprising:

a) an annular bearing race on said turntable;

b) said annular bearing race comprising a plurality of ball bearings arranged in a circle;

c) said platform being supported on said annular bearing race for rotation on said turntable about an axis;

d) said boom assembly including a boom mounted on said platform for movement in a plane which contains said rotation axis;

e) said boom including a main boom component of predetermined width which is pivotally connected to said platform by a first base pin; and f) a hydraulic actuator cylinder for said boom, said actuator cylinder being pivotally connected to said platform between vertical brackets by a second base pin;

g) said second base pin having a pivot axis positioned over said annular bearing race and opposite said rotational axis from the pivot axis of said first base pin;

h) said pivot axis of said second base pin being positioned vertically over said circle regardless of the rotational position of said platform and boom assembly relative to said turntable;

i) said hydraulic actuation cylinder being pivotally connected to said main boom component within the width to said main boom component.

4. The improvement in a turntable, rotatable platform and boom assembly of claim 3 further characterized in that:

a) said annular bearing race lies in a bearing race plane; and b) the pivot axis of said first base pin is positioned above said plane by a distance which is approximately 200% of the distance which the pivot axis of said second base pin is above said plane.

5. In a vehicular machine for harvesting timber wherein the machine includes a chassis supported by drive members, the improvement in a turntable, rotatable platform and boom assembly, comprising:

a) an annular bearing race on said turntable;

b) a platform supported on said annular bearing race for rotation on said turntable about an axis;

c) a boom mounted on said platform for movement in a plane which contains said rotation axis;

d) said boom including a main boom component of predetermined width which is pivotally connected to said platform by a first base pin; and e) a hydraulic actuator cylinder for said boom, said actuator cylinder being pivotally connected to said platform between vertical brackets by a second base pin; and f) said second base pin having a pivot axis positioned over said annular bearing race and opposite said rotational axis from the pivot axis of said first base pin;

g) said second base pin being positioned forwardly of said rotational axis by a distance which is approximately 40% of the distance which said first base pin is positioned rearwardly of said rotational axis;

h) said hydraulic actuation cylinder being pivotally connected to said main boom component within said width of said main boom component.

6. The improvement in a turntable, rotatable platform and boom assembly of claim 5 further characterized in that:

a) said annular bearing race contains a plurality of roller bearings; and b) at least one line through the center of said first base pin and parallel to said rotational axis passing through the center of rotation of said roller bearings as they roll.

7. In a vehicular machine for harvesting timber wherein the machine includes a chassis supported by drive members, the improvement in a turntable, rotatable platform and boom assembly, comprising:

a) an annular swing bearing on said turntable;

b) said platform being mounted on said annular swing bearing for rotation about an axis;

c) a boom mounted on said platform for movement in a plane which contains said rotation axis;

d) said boom including a main boom component which is pivotally connected to said platform;

e) a hydraulic actuator cylinder for said boom, said actuator cylinder being pivotally connected to said platform;

f) said pivot connection between said cylinder and said platform being positioned directly over said annular swing bearing substantially on a line intersecting the circle defined by said annular swing bearing and extending parallel to said axis of rotation, and positioned opposite said rotational axis from the pivot connection between said main boom component and said platform.

8. The improvement in a turntable, rotatable platform and boom assembly of claim 7 further characterized in that:

a) said annular swing bearing comprises a series of ball bearings forming a circular bearing race; and b) said pivot connection between said cylinder and said platform is positioned approximately on a line which extends parallel to said axis and intersects said circular bearing race regardless of the rotational position of said platform and boom assembly relative to said turntable.

9. The improvement in a turntable, rotatable platform and boom assembly of claim 8 further characterized in that:

a) said pivot connection between said cylinder and said platform is at a predetermined height above the height of a plane through said ball bearings race, and said pivotal connection between said boom main component and said platform is at a height approximately twice as great as said predetermined height above said plane through said ball bearing race.

10. The improvement in a turntable, rotatable platform and boom assembly of claim 9 further characterized in that:

said predetermined height is about 10 inches.

11. The improvement in a turntable, rotatable platform and boom assembly of claim 7 further characterized in that:

a) said pivot connection between said cylinder and said platform being spaced at a distance from said axis which is approximately 40% of the distance between said axis and the pivot connection between said main boom component and said platform.

* * * * *